United States Patent

[11] 3,566,855

| [72] | Inventor | Curtis L. Morgan<br>Sigel, Ill. |
|---|---|---|
| [21] | Appl. No. | 868,007 |
| [22] | Filed | Oct. 21, 1969 |
| [45] | Patented | Mar. 2, 1971 |
| [73] | Assignee | Fedders Corporation<br>Edison, N.J. |

[54] SELF-CLEANING COOKING APPARATUS
18 Claims, 4 Drawing Figs.

[52] U.S. Cl. .................................................... 126/19
[51] Int. Cl. .................................................... A21b 1/00
[50] Field of Search ........................................ 126/19,
273; 106/(Inquired); 117/(Inquired);
134/(Inquired); 252/(Inquired)

[56] References Cited
UNITED STATES PATENTS

| 3,266,477 | 8/1966 | Stiles.............................. | 126/19 |
| 3,271,322 | 9/1966 | Stiles.............................. | 126/19X |
| 3,460,523 | 8/1969 | Stiles et al..................... | 126/19 |

*Primary Examiner*—Charles J. Myhre
*Attorney*—Kane, Dalsimer, Kane, Sullivan and Kurucz

ABSTRACT: A self-cleaning, abrasion-resistant surface for a cooking apparatus comprising a three-layer coating on a metal surface, each of the first two layers comprising a mixture of a ceramic and a catalytically active material, with, preferably, increased amounts of catalyst in the second coating layer, and an interrupted layer of ceramic above the two-layer coating. Improved bond between the three-layer coating and the base structure of the cooking apparatus can be achieved through the use of a sandwiched ceramic layer.

PATENTED MAR 2 1971

3,566,855

INVENTOR
CURTIS L. MORGAN
BY
Kane, Dalsimer, Kane, Sullivan & Kurucz
ATTORNEYS

SELF-CLEANING COOKING APPARATUS

CROSS-REFERENCE TO RELATED APPLICATIONS

This application is concerned with the same field as my copending application, Ser. No. 790,772, filed Jan. 13, 1969 entitled "Self-Cleaning Cooking Apparatus," assigned to the same assignee as the present invention.

BACKGROUND OF THE INVENTION

A self-cleaning cooking apparatus is described in U.S. Pat. No. 3,266,477—Stiles, wherein a catalytically active material is coated onto the exposed surfaces of a cooking apparatus. Similarly, that patent describes a method for forming these self-cleaning surfaces.

Among the methods recited by this patent for forming the catalytically active surface is the formation of a ceramic coating on a metal sheet and the partial embedding of the catalyst in this coating. In some circumstances, a further inorganic material is used, so that a catalyst carrier is embedded in the ceramic, rather than directly embedding the catalyst material, itself. The catalyst is then applied to this catalyst carrier to form the final product.

While, in general, this apparatus and method provide a surface which adequately performs its function of cleaning food spills which come in contact with the surfaces through the application of moderate temperatures, i.e., 350° F., or preferably, 400° F. to 500° F., or more, the apparatus produced does not completely perform the intended function under conditions of actual use.

In my aforementioned copending application, I described a self-cleaning surface for a cooking apparatus which comprises a two-layer coating on a metal surface, the first coating being a mixture of a ceramic and a catalytically active material, while the second coating is of catalytically active material. In that application, a method is also described for forming the particular type of catalytic surface.

The catalytic surface described in my copending application is entirely adequate for the self-cleaning of the walls of a cooking apparatus under conditions of actual use. However, as the top layer is formed, primarily, of catalytic material, it is relatively soft. Thus, it will not withstand the abrasion of moving cooking utensils such as frequently occurs on the floor or door of a normal cooking oven.

SUMMARY OF THE INVENTION

In accordance with the present invention, a novel surface structure for use in cooking apparatus has been developed, the surface being self-cleaning under moderate temperature conditions, such as those normally employed in cooking, and which will withstand the abrasion to which certain surfaces of the cooking apparatus, such as the floor and door of an oven, are normally subjected.

According to the present invention, the exposed surfaces of the cooking apparatus, particularly those surfaces subjected to abrasion in normal use, have a three-coat system applied. This three-coat system provides, not only, the necessary catalytic activity for the self-cleaning of these surfaces, but additionally, it is sufficiently abrasion resistant to withstand the abrasion to which these surfaces are subjected, such as by the moving of cooking utensils, including baking pans, etc.

The first two coatings employ, in combination, a catalyst and a ceramic of the type generally employed within cooking surfaces. While varying amounts of the catalyst and ceramic ground coat can be used, for the best structural integrity of the surface and catalytic activity for destruction of spills and other staining material, the catalyst generally comprises from about 34 to 54 percent, and the ground coat from about 42 to 62 percent of the first coating, while the ground coat comprises from about 22 to 40 percent and the catalyst from about 50 to 65 percent of the second coat. Other materials, such as colorants and opacifiers can also be included.

The third coat is a stipple of a hard glass which is required in order to fully provide the abrasion resistance. The material is employed, in different forms, for appearance only. Only a portion of the second catalyst coating is covered by this stipple, so as to allow sufficient exposed catalyst to provide for the necessary catalytic activity in the coating.

Firm bonding of the second, more catalytically active coat, is achieved through the generation of a toothed surface on the first catalyst-containing coating, which allows an interlocking and firm bonding of the two catalyst-containing coatings. Additionally, while significant bonding to a metal surface is achieved employing the first catalyst-containing coating, which is relatively high in ceramic ground coat, additional bonding and corrosion resistance can be achieved through use of a standard ground coat between the metal surface and the first catalyst-containing coating. This ground coat can include up to 30 percent calcined alumina, by weight.

It is thus an object of this invention to provide a self-cleaning cooking apparatus having a firmly bonded catalytic surface.

It is a further object of this invention to provide a self-cleaning surface for a cooking apparatus, where that surface will withstand abrasion.

DESCRIPTION OF THE PREFERRED EMBODIMENTS

Figure 1:
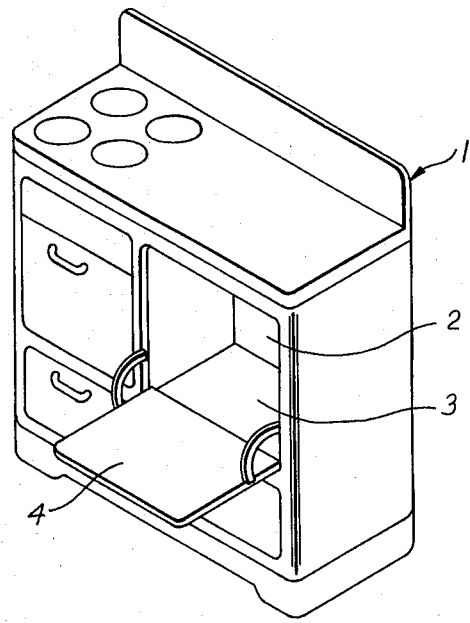
FIG. 1 is a conventional household stove, illustrative of a cooking device to which the present invention is applicable.

Referring particularly to the drawings, FIG. 1 illustrates a household stove 1 having an oven portion 2. The floor of the oven 3 and inner surface 4 of the oven door are also shown. The walls of this oven can be coated with catalytically active material in accordance with the invention of my copending application, Ser. No. 790,772, filed Jan. 13, 1969, and assigned to the same assignee as the present invention.

Figure 2:
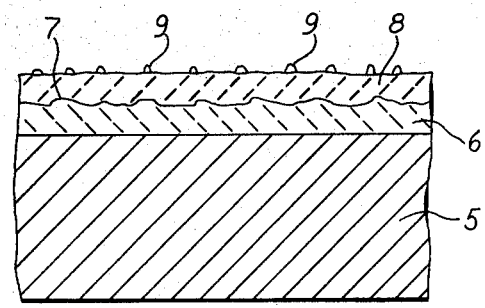
FIG. 2 is a schematic representation of the firmly adhered catalytic surface for such a cooking apparatus, in accordance with the present invention.
Figure 4:
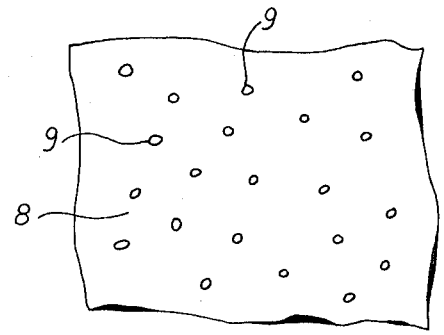
FIG. 4 is a plan view of the surface of a catalytically active coating, in accordance with the present invention.
Figure 3:
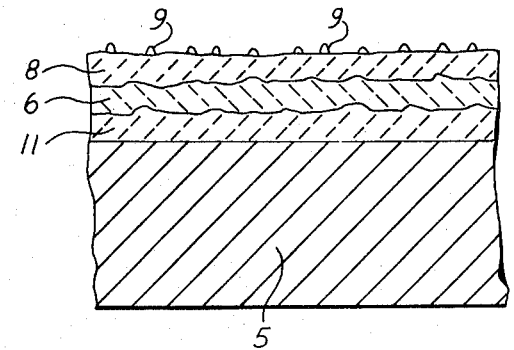
FIG. 3 is a schematic representation of a firmly adhered catalytic surface for such a cooking apparatus, in accordance with the present invention, and having, in addition, a ceramic ground coat between the wall of the oven and the catalytically active material.

The floor 3 and inner surface 4 of the door are coated in accordance with the present invention, either as illustrated in FIG. 2 or in FIG. 3. In FIG. 2 the coating system is illustrated with two catalyst-ceramic layers and no intermediate ceramic coat. The oven floor, or inner wall of the oven door, prior to coating, is shown as the metal layer 5. To this metal layer is applied a first catalyst-ceramic layer 6 on which is formed a toothed surface 7. A second catalyst-ceramic layer 8 is applied to the first catalyst-ceramic layer 6. The second layer is firmly bonded to the first through the interlocking at the toothed surface 7. In general, the catalyst content of the second layer 8 is higher than the catalyst content of the first layer 6. Finally, a stipple 9, or other abrasion resistant coating, is applied to the top of the second catalyst-ceramic layer. As can be seen in FIG. 4, a significant portion of the upper surface of the second catalyst-ceramic layer 8 is left exposed after the stipple 9, or other abrasion resistant treatment is applied.

In FIG. 3, the structure of the coating employing an additional ceramic coat is illustrated where, again, the oven floor or inner surface of the oven door is shown as the metal layer 5. To the surface of this metal layer is applied a ceramic coating 11 which can be formed of the same ground coat material as is presently generally employed for the coating of cooking apparatus surfaces, with up to 30 percent by weight, of calcined alumina added. Preferably, the amount of calcined alumina used is from about 20 to 25 percent, by weight. A first catalyst-ceramic layer 6, of the same type as the catalyst-ceramic layer employed in the embodiment according to FIG. 2, is then applied to the ground coat layer. Both the ground coat layer 11 and the catalyst-ceramic layer 6 are formed with toothed surfaces in order to aid in bonding the next layer. To the first catalyst-ceramic layer 6 is applied a second catalyst-ceramic layer 8, again of the same form as employed in accordance with the embodiment illustrated in FIG. 2. Finally, as with the embodiment illustrated in FIG. 2, a stipple 9, or other abrasion resistant coating is applied to intermittent areas of the surface of the second catalyst-ceramic layer 8. The appearance of the upper surface of the catalyst coating in accordance with the embodiment illustrated in FIG. 3, is the same as that shown in FIG. 4, for the embodiment of FIG. 2.

The metal walls of the oven can be any suitable material of construction, including those normally employed for these purposes. Thus, these walls can be formed of iron, iron alloys and steel, or any of the various alloys of iron, chromium and nickel. The metal can also be a chromium and chromium-nickel alloy, or aluminum or an alloy of aluminum. These metal walls, further, can be formed with two layers of metal, as, for example, galvanized iron or copper, or aluminum-clad iron or stainless steel. The two-layer metals, when employed, can also be formed by electroplating, such as the plating or coating of copper, chromium, or other metals onto iron, steel, or the other metals suggested for this purpose.

The ceramic ground coats which are employed in the first and second catalyst-ceramic layers, and in the intermediate ground coat layer of the embodiment illustrated in FIG. 3 when that intermediate layer is used, can be any of those normally used in coating the walls of cooking applicances, as at present. Numerous materials of this type are described in the book by E. E. Bryant, "Porcelain Enameling Operations," Enamelist Publishing Company, Cleveland, Ohio, Revised Edition, 1964. The enamels selected for this structure should have glass melting temperatures somewhat above 1,450° F., and preferably in the range of about 1,500° F.

The catalysts employed in both the first and second catalyst-ceramic layers are those described in the aforementioned Stiles patent. These catalysts are effective above 275° F. or, more preferably, between about 350° F. and 500° F., though their catalytic activity is still present at temperatures somewhat above 500° F.

More specifically, the catalytic materials which are useful in oxidizing food spills on the cooking surfaces, as with the oven floor and inner wall of the oven door in the present invention, can be any of the catalytically active compounds of copper, tin, vanadium, niobium, bismuth, chromium, molybdenum, tungsten, manganese, rhenium, iron, cobalt, nickel, and the rare earth metals, such as cerium. The precious metals, ruthenium, rhodium, palladium, platinum, and compounds of these precious metals can also be employed. In general, the various catalytic metals will be used in the forms of their oxides, cerates, manganates, manganites, chromates, chromites, or vanadates.

Especially preferred catalysts, because of their comparatively high activity at low temperatures, are ruthenium, palladium, and platinum metals, and the oxides, cerates, manganates, manganites, chromates, chromites, and vanadates of cobalt, nickel, ruthenium, palladium, platinum and the rare earth metals.

In coating the cooking apparatus surfaces according to the present invention, the metal base sheet is first cleaned. The type of cleaning will vary with the type and condition of the metal employed and, with a normal iron sheet, standard pickling processes can be employed. Other methods of cleaning the metal surface so as to provide for adherence of the ceramic or catalyst-ceramic coating are generally well known in the art.

To this cleaned metal surface, according to the embodiment illustrated in FIG. 2, a first coating of catalyst-ceramic is applied. This first catalyst-ceramic coating is comprises of three components in the amounts as noted:

| | |
|---|---|
| Ceramic Ground Coat | 42 to 62 percent |
| Catalyst | 34 to 54 percent |
| Oxides (As Coloring Materials) | 0 to 15 percent. |

In general, when coloring is desired, the oxides employed are selected from the class consisting of cobalt oxide, manganese oxide, iron oxide, chromium oxide, zinc oxide, titanium dioxide, and nickel oxide. Additionally, opacifiers, such as silica and alumina, can be included. As noted, this coat may be applied uncolored.

This first catalyst-ceramic coating is generally applied by spraying a dusty coating of a blend of the materials in a water slurry onto the cleaned metal surface in a thickness of from 0.5 to 1.5 mils. The slurry generally contains from about 25 to 45 percent water, by weight. The coating is dried at a temperature of about 350° F. for about 10 minutes and is then fired at 1,500° F. for approximately 3.5 minutes. The material is well bonded to the metal base following this treatment and, because of the spraying, is provided with a toothed surface to which the second catalyst-ceramic coating is bonded.

The second catalyst-ceramic coating is similar in form to the first catalyst-ceramic coating, but, preferably, contains a higher concentration of the active catalyst. The constituency of this catalyst-ceramic coating is:

| | |
|---|---|
| Ceramic Ground Coat | 22 to 40 percent |
| Active Catalyst | 50 to 65 percent |
| Oxides (As Coloring Materials) | 0 to 15 percent |

As with the first catalyst-ceramic coating, the ceramic ground coat is one of those described in the aforementioned E. E. Bryant book on "Porcelain Enameling Operations," the catalysts are those previously referred to, and the oxides, when desired, are employed as coloring materials and opacifiers and can be selected from the same class as those described with respect to the first catalyst-ceramic coating.

This second ceramic-catalyst coating is generally applied by spraying a wet layer of material which has previously been blended in accordance with the above-referenced formulation in a thickness of from 1 to 3 mils. The materials of each catalyst-ceramic coating are wetted, prior to application, by blending with water, preferably distilled or de-ionized, in amounts of from about 25 percent to 45 percent, based upon the total materials employed. The coating is dried at a temperature of 350° F. for approximately 10 minutes, but is not completely cured until application of the abrasion-resistant material.

After drying of the second catalyst-ceramic coating the abrasion resistant treatment is applied. This abrasion resistant coating is applied in an interrupted pattern, so as to cover the entire surface of the portion of the cooking apparatus being treated, but in such a manner as to cover only about 1 to 10 percent of the overall surface area. Preferably, this coating occupies no more than about 5 percent of the overall surface.

The preferred method of applying the abrasion resistant coating is by screening, stippling, or otherwise patterning a standard porcelain enamel onto the partially cured surface of the second catalyst-ceramic coating layer. Of course, this porcelain can be colored, and can be colored so as to contrast with, or complement, the coloring of the second catalyst-ceramic coating layer. Following application of the abrasion-resistant material, the surface, with the applied catalyst layers and abrasion resistant layer is fired at approximately 1,500° F. for about 3 ½ minutes. This firing completes the cure of the second catalyst-ceramic layer, and also fuses the final abrasion-resistant coating.

When it is desired to increase the bond between the catalyst containing layers and the bare, clean metal surface to which the catalyst is applied, a coating of a standard ceramic ground coat with up to 30 percent, by weight, of calcined alumina, is applied directly to the cleaned metal surface. Again, this ceramic ground coat is selected from those materials described in "Porcelain Enameling Operations" by E. E. Bryant, as previously referred to. The calcined alumina, when used, is preferably employed in amounts of from about 20 to 25 percent. The addition of the calcined alumina aids in preventing remelting and flowing of the layer during subsequent processing of the surface. If this bonding ground coat is employed, it is applied as a water slurry, with from 25 to 45 percent, in a thickness of from 1 to 2 mils, and is dried at a temperature of about 350° F. for 10 minutes, until a bisque is formed. The coating is then fired at a temperature of about 1,500° F. for 3.5 minutes in order to finally fuse it. This coat, too if applied, is provided with a toothed surface which aids in bonding the first catalyst-ceramic coating.

Employing the coating arrangement of the present invention, the bonding achieved is equivalent to that achieved with a standard porcelain ground coat enamel. At the same time, the catalytic activity of the system is high and average soiling is removed, at normal baking temperatures, in periods of from 2 to 3 hours. The excellent bond is, in all probability, achieved because of the high ceramic content of the layer which most closely approaches the metal surface of the cooking apparatus, while the high catalytic activity is achieved because of the higher catalyst content of the upper surface.

This upper surface, because of the method of application, has a matte finish, which is slightly porous. Because of this property, food spills which may occur, either on the floor of an oven, or on the inner wall of an oven door, are dispersed so as to provide more exposed area on which the oxidative catalyst can work.

The catalytic surface developed by the system of the present invention is substantially free from permanent staining resulting from spills of grease, fat, pie baking, or starch. Additionally, these surfaces are washable with mild soaps and with plain water. Additionally, water washing of the surface will cause ash or solid residue, which may have become entrapped within the catalytic coating to be released, so as to be removable.

In order that those skilled in the art may be better informed as to the manner in which the present invention may be employed, the following examples are given as illustrations. Various tests are referred to in these examples, including a bonding test, an abrasion test, and a catalytic activity test.

The bonding test is accomplished by clamping a 4 inch by 6 inch metal plate, coated in accordance with the present invention, into a test fixture with the abrasion resistant side up. A 2.5-pound, round ended weight was suspended 36 inches above the plate. The weight was allowed to free fall and strike the surface. A good bond is evidenced when there is only a partial removal of frit and catalyst, such that the exposed metal surface retains a dull, matte appearance, with some of the ceramic glass still embedded in the iron. An unacceptable bond would be evidenced by full or partial removal of the catalyst and ceramic from the metal surface, in such a manner that the exposed metal surface has a shiny appearance without any embedding of ceramic glass.

In the abrasion test, a metal sheet treated in accordance with the present invention is subjected to the sliding action of a large roasting pan containing a 10-pounds weight. The roasting pan, containing the weight, is moved back and forth on the treated sheet several times. A satisfactory abrasion resistance is indicated by the absence of scratches on the upper catalyst-ceramic surface and by the presence of all of the abrasion-resistant coating originally present.

To check for catalyst activity, a 4 inch by 6 inch test plate, formed in accordance with the present invention, is treated with one drop each of hamburger fat, ham fat, and sausage fat, extracted by roasting these meats in a covered dish. The plate is then heated to 375° F. for a period approximately 2 hours. Diminishment of the soiled spots indicates the presence of catalytic activity. At broiling temperatures, cleaning of the spots should be accomplished within 30 minutes.

EXAMPLE 1

A 14 inch by 18 inch panel of enameling iron, 0.047 inch thick, was coated with a 2-mil thick coating of ground coat porcelain enamel of the type shown on page 100 of the previously referenced Bryant text. This enamel was dried at a temperature of 350° F. for approximately 10 minutes until a bisque was formed. The coating was then fired at a temperature of 1,500° F. for about 3.5 minutes.

A 1-mil thick coating containing 47.5 percent of dark blue A. R. ground coat, as described on page 58 of the Bryant text, 47.5 percent of a rare earth oxide catalyst consisting, primarily, of cerium oxide in a powder form, and 5 percent of a mixture of chromium, iron, and zinc oxides, was then applied to the toothed surface formed on the first ceramic coat from a slurry containing about 30 percent de-ionized water, by weight. The sheet was then heated to a temperature of 350° F. for 10 minutes in order to dry this first catalyst-ceramic layer and was then fired at 1,500° F. for approximately 3.5 minutes, resulting in a toothed surface on this first catalyst-ceramic layer.

A third coating was then applied, 2-mil thick, this coating consisting of 28 percent dark blue ground coat enamel, of the same kind as applied in the first catalyst-ceramic layer, 62 percent catalyst of the same type as employed in the first layer, and 10 percent of a mixture of chromium, iron, zinc, and titanium oxides, as coloring materials. The coating was applied as a slurry containing approximately 35 percent water. The coating was dried at a temperature of 350° F. for 10 minutes.

A white titania enamel was stippled over the second catalyst-ceramic layer so as to cover approximately 5 percent of the total surface. The white titania enamel is as described on page 57 of the Bryant text. The plate, now having three coating layers plus the stippling layer, was fired at 1,500° F. for about 3.5 minutes, in order to complete the fusion.

After the test plate had cooled, the bonding test, abrasion test, and catalytic activity test were all performed and the plate was found satisfactory.

EXAMPLE 2

A 10 inch by 12 inch panel of enameling iron, 0.034 inch thick, was coated with a 2.5-mil thick coating of ground coat porcelain enamel of the type shown on page 100 of the previously referenced Bryant test. This enamel was dried at a temperature of 350° F. for approximately 10 minutes until a bisque was formed. The coating was then fired at a temperature of 1,500° F. for about 3.5 minutes.

A 1.5 mil thick coating containing 45 percent of dark blue A. R. ground coat, as described on page 58 of the Bryant test, 51 percent of a rare earth oxide catalyst consisting, primarily, of cerium oxide in a powder form, and 4 percent of chromium oxide was then applied to the toothed surface formed on the first ceramic coat. The application was from a slurry having about 32 percent water, by weight. The sheet was then heated to a temperature of 350° F. for 10 minutes in order to dry this first catalyst-ceramic layer and was then fired at 1,500° F. for approximately 3.5 minutes, resulting in a toothed surface on this first catalyst-ceramic layer.

A third coating was then applied, 2.5-mil thick, this coating consisting of 32 percent dark blue ground coat enamel, of the same kind as applied in the first catalyst-ceramic layer, 60 percent catalyst of the same type employed in the first layer, and 8 percent of a mixture of chromium, iron, and zinc oxides, as coloring materials. The coating was dried at a temperature of 350° F. for 10 minutes.

A white titania enamel was stippled over the second catalyst-ceramic layer so as to cover approximately 4 percent of the total surface. The white titania enamel is as described on page 57 of the Bryant text. The plate, now having three coating layers plus the stippling layer, was fired at 1,500° F. for about 3.5 minutes, in order to complete the fusion.

After the test plate had cooled, the bonding test, abrasion test, and catalytic activity test were all performed and the plate was found satisfactory.

EXAMPLE 3

A 8 inch by 10 inch panel of enameling iron, 0.0239 inch thick, was coated with a 3-mil thick coating containing 47.5 percent of spray ground coat, as described on page 57 of the Bryant text, 47.5 percent of a rare earth oxide catalyst consisting, primarily, of cerium oxide in a powder form, and 5 percent of a mixture of chromium, iron, zinc, and titanium oxides. Application was from a slurry having about 30 percent water, by weight. The sheet was then heated to a temperature of 350° F. for 10 minutes in order to dry this first catalyst-ceramic layer and was then fired at 1,500° F. for approximately 3.5 minutes, resulting in a toothed surface on this first catalyst-ceramic layer.

A second coating was then applied, 4-mil thick, this coating consisting of 30 percent spray ground coat enamel, of the same kind as applied in the first catalyst-ceramic layer, 58 percent catalyst of the same type employed in the first layer, and 12 percent of a mixture of chromium, iron, zirconium, and zinc oxides, as coloring, and a mixture of silica and alumina, as opacifiers. Application was from a slurry containing approximately 35 percent water. The coating was dried at a temperature of 350° F. for 10 minutes.

A white titania enamel was stippled over the second catalyst-ceramic layer so as to cover approximately 3 percent of the total surface. The white titania enamel is as described on page 57 of the Bryant text. The plate, now having two coating layers plus the stippling layer, was fired at 1,500° F. for about 3.5 minutes, in order to complete the fusion.

After the test plate had cooled, the bonding test, abrasion test, and catalytic activity test were all performed and the plate was found satisfactory.

EXAMPLE 4

In comparison with the above examples, further test plates were made changing only the percentages. When less than 20 percent ceramic was used, the bond was not acceptable. When the titanium stipple was omitted, the abrasion resistance was not acceptable. When the percent of catalyst was 34 percent or less, there was insufficient catalytic activity.

Thus, a system has been described for coating the surfaces of a cooking apparatus in order to provide, not only catalytic activity, but abrasion resistance as well. Such coatings are particularly applicable to the floors of cooking ovens, and to the inside walls of the doors for these ovens, where significant abrasion is experienced, but catalytic activity is desired.

I claim:

1. In a cooking apparatus having means for heating a cooking area, means for supporting food to be cooked, walls at least partially enclosing the cooking area, a floor in said cooking area and a door having an inside wall, the improvement which comprises a coating, at least on said floor, said coating comprising:
    a. a first layer consisting essentially of a mixture of a ceramic and an oxidative catalyst, effective at 275° F. for oxidizing food spills, said surface having a rough, toothed finish;
    b. a second layer of ceramic and oxidative catalyst bonded to said first layer; and
    c. an abrasion-resistant coating on said second layer, said coating covering only intermittent portions of said second layer; whereby said oxidative catalyst is effective for the oxidation of food spills and said surface is not removed by normal abrasion.

2. The cooking apparatus of claim 1 wherein said walls are formed of a metal selected from the class consisting of iron, iron alloys and steel, chromium-nickel alloys, aluminum, and alloys of aluminum.

3. The cooking apparatus of claim 1 wherein said catalyst comprises at least one material selected from the class consisting of the oxides, cerates, manganates, manganites, chromates, chromites, and vanadates, of cobalt, nickel, ruthenium, palladium, platinum, and the rare earth metals.

4. The cooking apparatus of claim 3 wherein said catalyst consists essentially of cerium oxide.

5. The cooking apparatus of claim 1 wherein said first layer comprises from 42 to 62 percent ceramic, from 34 to 54 percent catalyst, and from 0 to 15 percent coloring oxides.

6. The cooking apparatus of claim 5 wherein said coloring oxides are selected from the class consisting of cobalt oxide, manganese oxide, iron oxide, chromium oxide, zinc oxide, titanium dioxide and nickel oxide.

7. The cooking apparatus of claim 1 wherein said second layer comprises from 22 to 40 percent ceramic, from 50 to 65 percent catalyst, and from 0 to 15 percent coloring oxides.

8. The cooking apparatus of claim 7 wherein said coloring oxides are selected from the class consisting of cobalt oxide, manganese oxide, iron oxide, chromium oxide, zinc oxide, titanium dioxide and nickel oxide.

9. The cooking apparatus of claim 1 wherein a ceramic ground coat having up to 30 percent calcined alumina is bonded to at least said floor, prior to application of said first layer.

10. In a cooking apparatus having means for heating a cooking area, means for supporting food to be cooked, walls at least partially enclosing the cooking area, a floor in said cooking area and a door having an inside wall, the improvement which comprises a coating, at least on the inner wall of said door, said coating comprising:
    a. a first layer consisting essentially of a mixture of a ceramic and an oxidative catalyst, effective at 275° F. for oxidizing food spills, said surface having a rough, toothed finish;
    b. a second layer of ceramic and oxidative catalyst bonded to said first layer; and
    c. an abrasion-resistant coating on said second layer, said coating covering only intermittent portions of said second layer; whereby said oxidative catalyst is effective for the oxidation of food spills and said surface is not removed by normal abrasion.

11. The cooking apparatus of claim 10 wherein said walls are formed of a metal selected from the class consisting of iron, iron alloys and steel, chromium-nickel alloys, aluminum, and alloys of aluminum.

12. The cooking apparatus of claim 10 wherein said catalyst comprises at least one material selected from the class consisting of the oxides, cerates, mangagates, manganites, chromates, chromites, and vanadates, of cobalt, nickel, ruthenium, palladium, platinum, and the rare earth metals.

13. The cooking apparatus of claim 12 wherein said catalyst consists essentially of cerium oxide.

14. The cooking apparatus of claim 10 wherein said first layer comprises from 42 to 62 percent ceramic, from 34 to 54 percent catalyst, and from 0 to 15 percent coloring oxides.

15. The cooking apparatus of claim 14 wherein said coloring oxides are selected from the class consisting of cobalt oxide, manganese oxide, iron oxide, chromium oxide, zinc oxide, titanium dioxide, and nickel oxide.

16. The cooking apparatus of claim 10 wherein said second layer comprises from 22 to 40 percent ceramic, from 50 to 65 percent catalyst, and from 0 to 15 percent coloring oxides.

17. The cooking apparatus of claim 16 wherein said coloring oxides are selected from the class consisting of cobalt oxide, manganese oxide, iron oxide, chromium oxide, zinc oxide, titanium dioxide and nickel oxide.

18. The cooking apparatus of claim 10 wherein a ceramic ground coat having up to 30 percent calcined alumina is bonded to at least the inner wall of said door, prior to application of said first layer.